United States Patent
Taipale

(10) Patent No.: US 6,191,378 B1
(45) Date of Patent: Feb. 20, 2001

(54) WELDING APPARATUS WITH EQUIPMENT USING SHIELDING GAS FOR FIRE FIGHTING

(75) Inventor: Asko Taipale, Tampere (FI)

(73) Assignee: Asko Taipale Oy, Tampere (FI)

(*) Notice: Under 35 U.S.C. 154(b), the term of this patent shall be extended for 0 days.

(21) Appl. No.: 09/367,892

(22) PCT Filed: Feb. 13, 1998

(86) PCT No.: PCT/FI98/00133

§ 371 Date: Aug. 20, 1999

§ 102(e) Date: Aug. 20, 1999

(87) PCT Pub. No.: WO98/36866

PCT Pub. Date: Aug. 27, 1998

(30) Foreign Application Priority Data

Feb. 24, 1997 (FI) ........................................ 970758

(51) Int. Cl.⁷ ............................................. B23K 9/16
(52) U.S. Cl. ................................. 219/74; 219/136
(58) Field of Search .......................... 219/72, 75, 136, 219/137 R; 266/48

(56) References Cited

U.S. PATENT DOCUMENTS

| | | |
|---|---|---|
| 3,945,440 | 3/1976 | Bohme . |
| 4,093,191 * | 6/1978 | Ferguson .......................... 266/48 |
| 4,634,833 | 1/1987 | Chemnitz . |
| 4,760,994 * | 8/1988 | Ferguson .......................... 266/48 |

FOREIGN PATENT DOCUMENTS

| | | |
|---|---|---|
| 3404314 | 8/1984 | (DE) . |
| 98438 | 3/1997 | (FI) . |
| 1220828 | 1/1971 | (GB) . |

* cited by examiner

Primary Examiner—Clifford C. Shaw
(74) Attorney, Agent, or Firm—Pollock, Vande Sande & Amernick, RLLP

(57) ABSTRACT

The invention relates to a welding apparatus, that includes a welding machine (1), shielding gas unit (4) and a nozzle part (3), that is connected to the welding machine (1). The welding rod (L), that is led to the welding point from the shielding gas unit (4), is arranged to be melted while being protected by the shielding gas in connection with the nozzle part (3) by means of an arc achieved by influence of the supply unit (1b) for welding current. To improve fire safety of the welding occasion, the welding apparatus includes furthermore a coupling arrangement (X), that comprises furthermore organs (X2), that are arranged to interrupt at least supply of welding current to the nozzle part (3) and to lead shielding gas to the point exposed for fire or that is burning through the nozzle part (3) at an essentially increased volume flow rate in respect to the welding occasion. A flow arrangement (Y) belonging to the coupling arrangement (X) is arranged essentially externally in respect to the welding machine (1) at least with a view to flow techniques, by leading shielding gas during the protecting situation in question directly from the shielding gas unit (4) past the welding machine (1) to the nozzle part (3).

8 Claims, 3 Drawing Sheets

WELDING APPARATUS WITH EQUIPMENT USING SHIELDING GAS FOR FIRE FIGHTING

Figure 1:
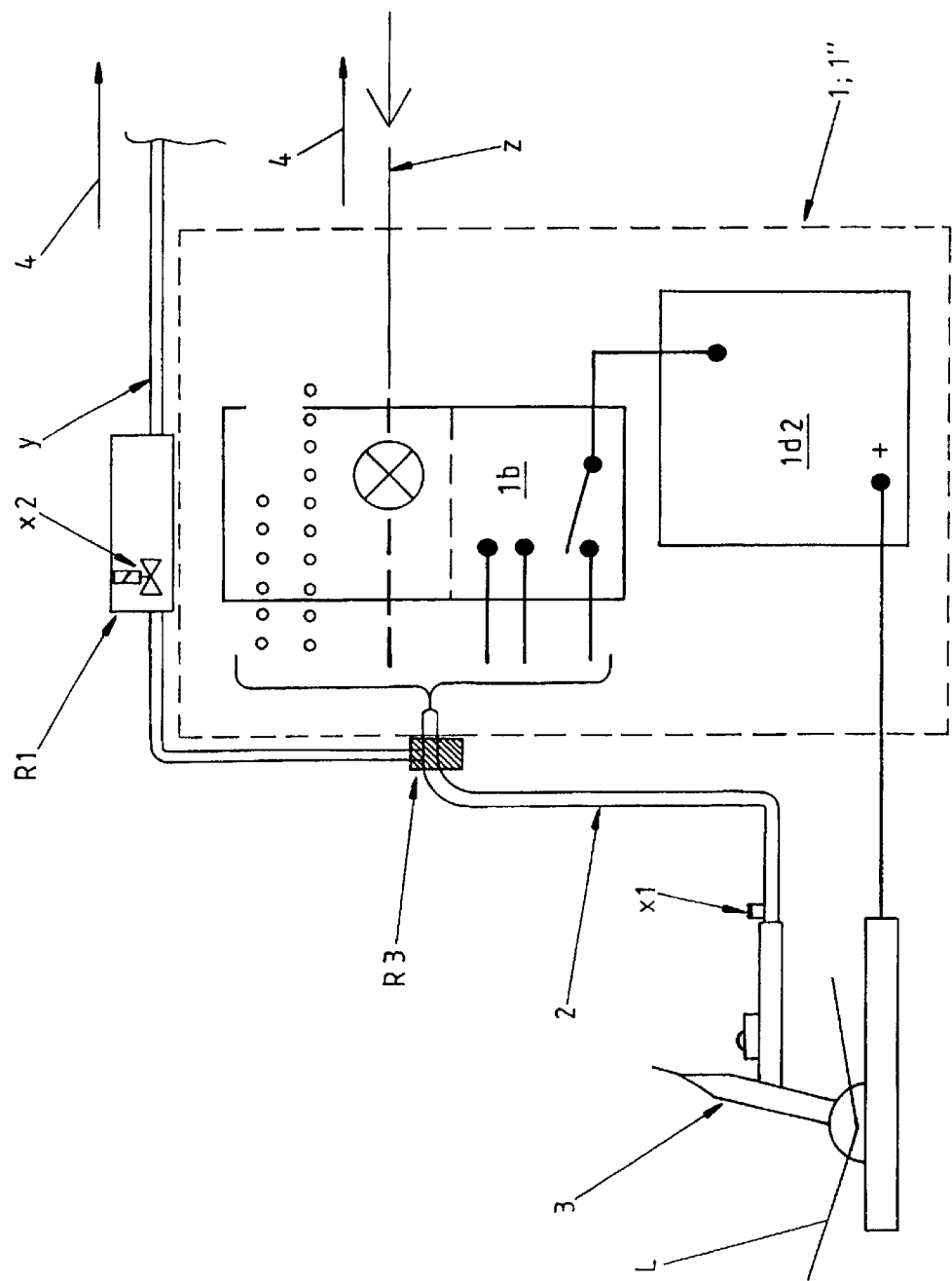

The invention relates to a welding apparatus, that includes a welding machine, that has at least a supply unit for welding current and means for adjustment of the welding current, shielding gas unit, that has at least means for observing, adjusting and/or for the like processing of the feed volume of the shielding gas, and a nozzle part, that is to be kept in hand and that is connected to the welding machine preferably by means of a flexible pipe unit. The welding rod, that is led to the welding point from the shielding gas unit, is arranged to be melted while being protected by the shielding gas in connection with the nozzle part by means of an arc achieved by influence of the supply unit for welding current. To improve fire safety of the welding occasion, such as to eliminate risk of fire or to suppress fire, the welding apparatus includes furthermore a coupling arrangement to lead shielding gas, that is led from the shielding gas unit belonging to the welding machine during a protecting occasion to the point, that is exposed for risk of fire or that is already burning, which coupling arrangement includes organs, that are arranged to interrupt at least supply of welding current to the nozzle part and to lead shielding gas to the point exposed for fire or that is burning, preferably by means of the flexible pipe unit through the nozzle part of an essentially increased volume flow rate in respect to the welding occasion.

The type of welding method described above corresponds to e.g. so called TIG-welding, that is being exploited very commonly for e.g. welding of thin sheet metal in such as e.g. garages or like. The method may be utilized as well in connection with so called MIG-welding, whereby the welding machine includes further more at least a unit for rod supply and means for regulating of the feed velocity of the rod. In this case also feeding of the welding rod from the rod supply unit through the nozzle part to the welding point is carried out by means of the flexible pipe unit.

A Finnish patent application FI 945614 and an application document DE 3 404 614 disclose the type of solutions above, that are intended for improvement of fire safety of the welding occasion. From the above it is known, that shielding gas, that is led from a shielding gas unit belonging to a so called MIG-welding apparatus, is being led to the point exposed for fire or that is burning through the nozzle part by means of organs, that are operated by means of a switch being placed advantageously in connection with the nozzle part, that during a trouble occasion interrupts supply of welding current and welding rod as well as switch on the feed volume of the shielding gas to be led by the nozzle part at an essentially increased rate in respect to the welding occasion.

Neither solution of the above discloses simple enough solutions particularly with a view to technical realization and due to the above with a view to manufacturing costs either, but in both of the above solutions internal couplings in respect to the welding machine are always requested to carry out flow techniques. This naturally requires in most cases cooperation with welding machine manufacturers, which particularly tends to rise manufacturing costs of welding apparatuses. In addition to the above it is very difficult in this type of solutions to amend in some other way already present welding apparatuses safer in the purpose described above.

It is an aim of the welding apparatus according to this invention to achieve a decissive improvement in the problems presented above and thus to raise essentially the level of the present: prior art in the field. To bring out this aim the welding apparatus according to the invention is mainly characterized by, that a flow arrangement belonging to the coupling arrangement is arranged essentially externally in respect to the welding machine at least with a view to flow techniques, by leading shielding gas during the protecting occasion in question directly from the shielding gas unit past the welding machine to the nozzle part.

As the most important advantages of the welding apparatus according to the invention may be mentioned simplicity and reliability of installation and use of the same, whereby by aid of the same it is possible with very simple arrangements and that is why also with profitable costs as well to secure a good safety of work of the work environment particularly with a view to fire safety e.g. by complementing usual welding machines by coupling arrangements according to the invention. The exploitation of the welding apparatus according to the invention is thus extremely simple, whereby prevention of a fire occasion is carried out as an advantageous embodiment very quickly by using only a switch in the nozzle part, in which case the organs being connected to the same e.g. during a MIG-welding interrupt feeding of welding current and of the rod to the nozzle part and in the same context switch on the shielding gas flow to the nozzle part, the volume rate of which is increased in respect to the same during a welding occasion. The welding apparatus according to the invention improves thus significantly safety of work, whereby fire damages caused directly or undirectly by welding may in the first place be controlled with profitable costs with a view to investment costs as well as prevented with simple and efficient enough arrangements from the point of view of the welder.

The dependent claims directed to the welding apparatus present advantageous embodiments of the welding apparatus according to the invention.

Figure 2:
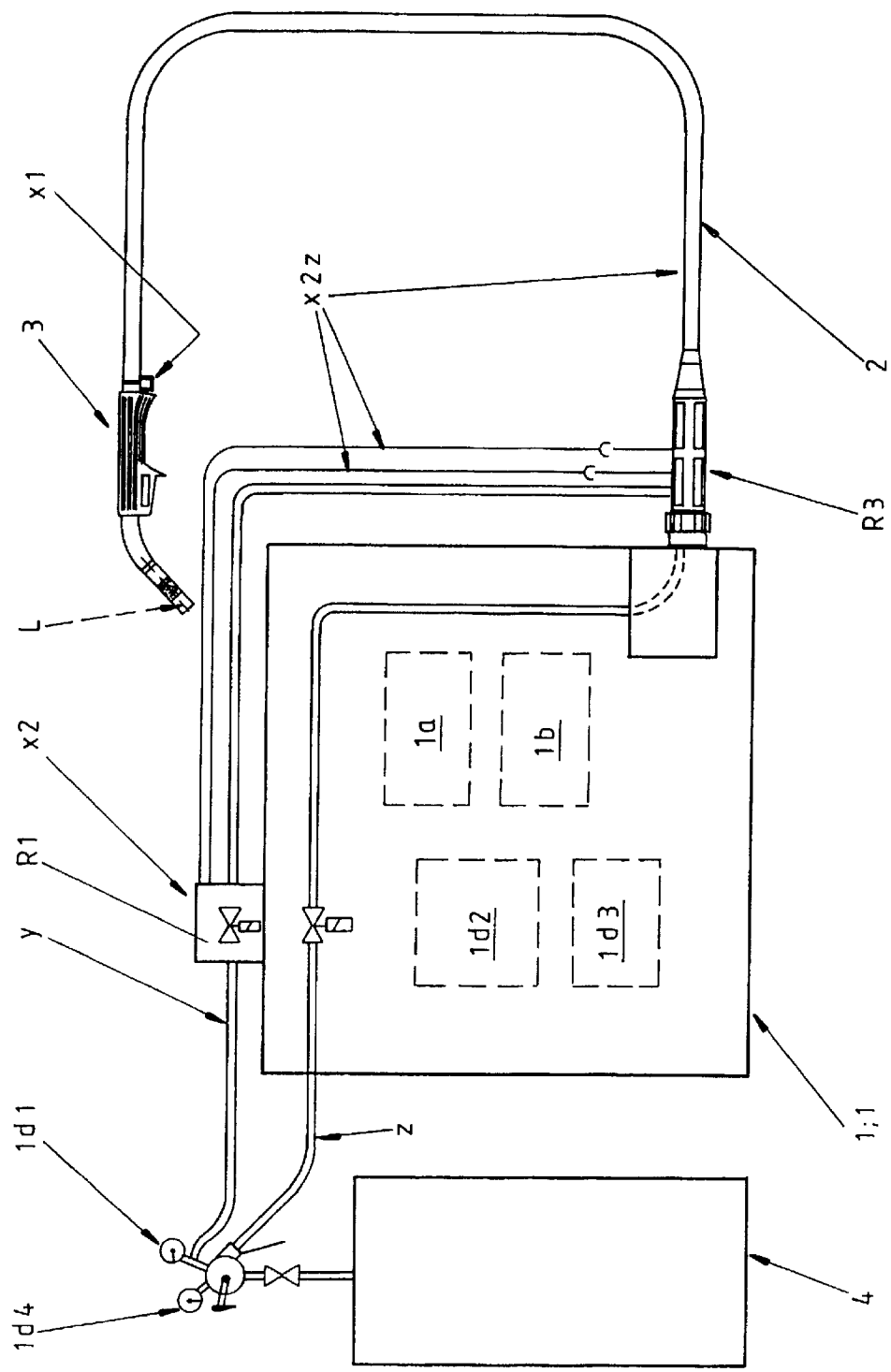
Figure 3:
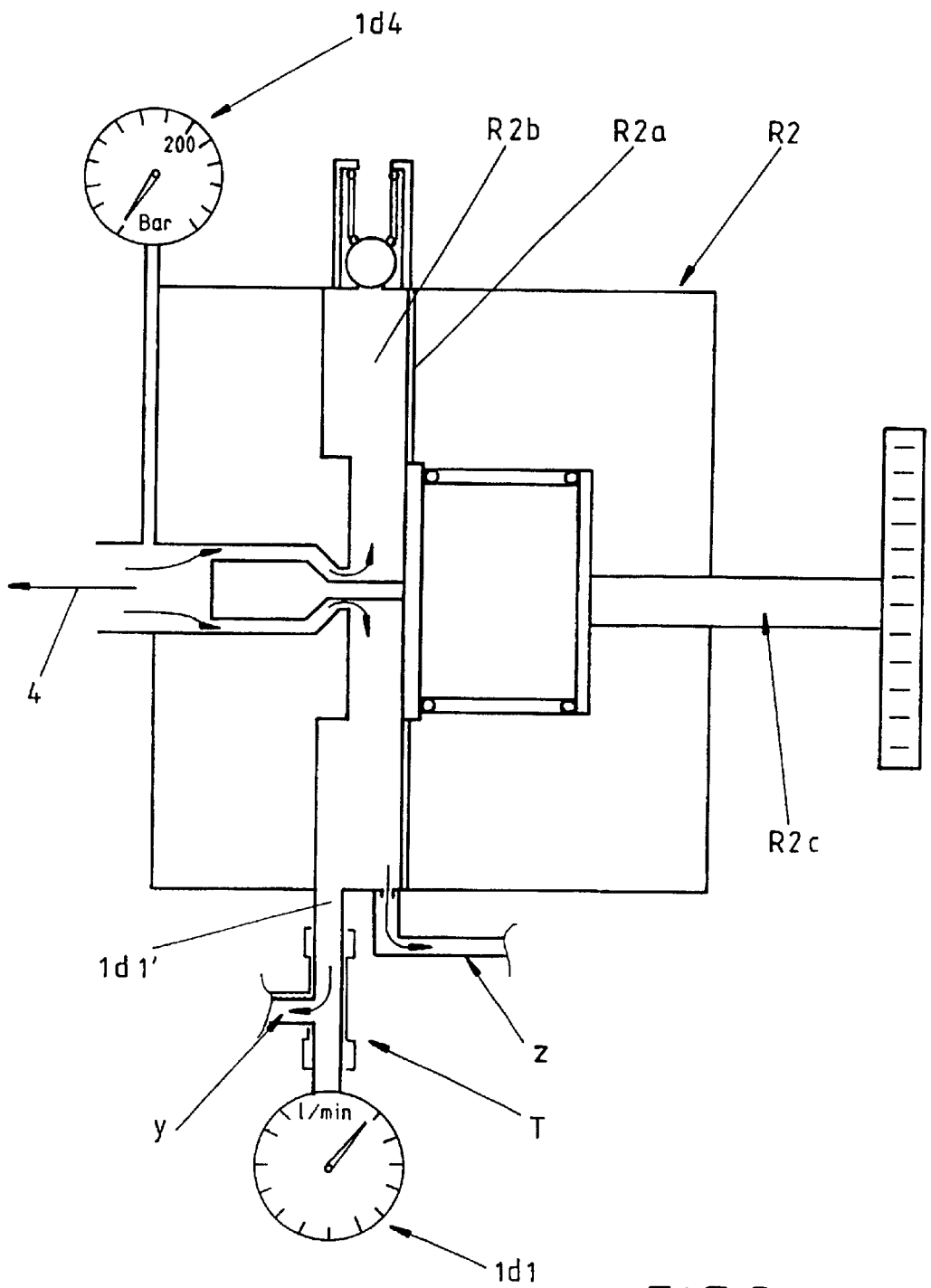

In the following description the invention is being explained in more detail with reference to the enclosed drawings, in which FIG. 1 shows an advantageous embodiment of the invention in connection with a so called TIG-welding apparatus, FIG. 2 shows furthermore an advantageous embodiment of the invention in connection with a so called MIG-welding apparatus, and FIG. 3 shows an advantageous embodiment according to the invention in connection with a so called pressure reduction arrangement.

Welding apparatus, that includes a welding machine 1, that has at least a supply unit 1b for welding current and means 1d2 for adjustment of the welding current, shielding gas unit 4, that has at least means 1d1 for observing, adjusting and/or for the like processing of the feed volume of the shielding gas, and a nozzle part 3, that is to be kept in hand and that is connected to the welding machine 1 preferably by means of a flexible pipe unit 2. The welding rod L, that is led to the welding point from the shielding gas unit 4, is arranged to be melted while being protected by the shielding gas in connection with the nozzle part 3 by means of an arc achieved by influence of the supply unit 1b for welding current. To improve fire safety of the welding occasion, such as to eliminate risk of fire or to suppress fire, the welding apparatus includes furthermore a coupling arrangement X to lead shielding gas, that is led from the shielding gas unit 4 belonging to the welding machine 1 during a protecting occasion to the point, that is exposed for risk of fire or that is already burning. The coupling arrangement X includes organs X2, that are arranged to interrupt at least supply of welding current to the nozzle part 3 and to lead shielding gas to the point exposed for fire or that is burning, preferably by means of the flexible pipe unit 2 through the nozzle part 3 at an essentially increased volume flow rate in respect to the welding occasion. A flow arrangement Y belonging to the coupling arrangement X is arranged essentially externally in respect to the welding machine 1 at least with a view to flow techniques, by leading shielding gas during the protecting occasion in question directly from the shielding gas unit 4 past the welding machine 1 to the nozzle part 3.

As an advantageous embodiment particularly with a view to FIG. 3 a pressure reduction assembly R2 is coupled to the shielding gas unit 4 of which there is coupled a pressure reduction assembly R2, in connection with which there exists at least control means 1d1 for observing, adjusting and/or for the like processing of the feed volume of the shielding gas and preferably means 1d4 for observing of the pressure of shielding gas unit 4, such as a pressure gauge. The pressure reduction assembly R2 includes advantageously furthermore a secondary space R2b for shielding gas under reduced pressure, whereby the pressure state of the secondary space R2b is preferably adjustable by means of regulating means R2c. The space, that is limited by a pressure membrane and adjustable typically by a screw R2c, has furthermore a first duct 1d1' for the control means 1d1 being connected to the secondary space R2b as well as a second duct for leading of the shielding gas flow Z during the welding occasion. To carry out the principles above as efficiently and reliably as possible, the first end I of the flow arrangement Y is connected directly to the secondary space R2b in other words advantageously by means of a branch tubing, that is connected e.g. to the first duct 1d1'. Correspondingly as shown in FIGS. 1 and 2, the second end II of the flow arrangement Y is connected to a connection piece R3, by which the pipe unit 2 is connected to the welding machine 1.

As explained above FIG. 1 shows an entirety mostly for so called TIG-welding and FIG. 2 furthermore in principle e.g. a so called MIG-welding apparatus. In this case the welding machine 1 comprises furthermore at least a rod supply unit 1a and means 1d3 for regulating of the feed velocity 1d3 of the rod. In addition to that, supply of the welding rod L from the rod supply unit 1a is arranged by means of a flexible pipe unit 2. The organs X2 belonging to the coupling arrangement X are arranged to interrupt also feeding of the welding rod L to the nozzle part 3 during the protecting occasion by means of a switch X1, such as a press button or like, that exists essentially in connection with the nozzle part 3. As shown in FIGS. 1 and 2, at least a part of the organs X2 belonging to the coupling means X are placed in a coupling box R1 being attached e.g. externally to the welding machine 1.

Furthermore as an advantageous embodiment, the organs X2 comprise preferably an electric coupling assembly for starting of the shielding gas flow for the protecting occasion and for interrupting of the same as well, such as an electromagnetic valve or like, that is placed inside the coupling box R1 and the operating current of which is preferably taken from the welding machine 1.

According to the principles shown in FIGS. 1 and 2, control of the electric coupling assembly X2, such as electric wirings X2z between the coupling box R1 and the switch X1 are carried out by arrangements, being placed at least partly inside the pipe unit 2 and at least partly externally in respect to the welding machine 1. This enables first of all a very simple installation, that makes it also possible to equip existing welding machines with auxiliary equipment according to the invention for improvement of fire safety.

Furthermore as an advantageous embodiment particularly with a view to FIG. 2, the electric wiring X2z leaving from the coupling box R1 is connected to the connection piece R3, that connects the pipe unit 2 to the welding machine 1. To assure simple retrofit, the coupling box R1 is arranged to be attached removably preferably by means of quick-lock principle to the casing of the welding machine 1, in which case in the casing of the welding machine 1 there has been arranged furthermore advantageously e.g. usual coupling assemblies as well to connect the electric functionings between the welding machine 1 and the connection box R1 to each other.

With external flow arrangements Y in respect to the welding machine 1 it is possible when compared to previous solutions first of all to assure an entirety, that operates reliably under all circumstances, because with the arrangements described above, it is possible to avoid so called narrow points in leading of shielding gas, which problem exists when using traditional welding apparatuses, in which there may exist blocks and the like flow retarders in a way, that when leading shielding gas through such points during a fire occasion or the like risk situations, not enough shielding gas may be led through the nozzle part in order to achieve a significant effect. Thanks to the invention this kind of bottlenecs may be efficiently eliminated, because flowing of the shielding gas during such a protecting occasion takes place partly via routes of its own in respect to the actual welding occasion so that mutually not any actual harm is caused in practice.

It is obvious, that the invention is not limited to the presented or described embodiments above, but instead it may be varied to a great extent within the basic idea of the invention. In this case it is first of all clear, that the simple principle according to the invention may be exploited in other types of weldings as well, in which shielding gas is being used in one form or another and that is being led through the nozzle part. It is naturally possible to arrange the organs to operate deviatingly from what is being presented above by means of pressure or on the other hand by using certain types of spring solutions, the operating reliability may, however, be worse than the solution being represented above or may require test runs carried out with certain intervals to secure functioning of the same.

What is claimed is:

1. Welding apparatus, that includes a welding machine (1), that has at least a supply unit (1b) for welding current and means (1d2) for adjustment of the welding current, shielding gas unit (4), that has at least means (1d1) for observing, adjusting and processing of the feed volume of the shielding gas, and a nozzle part (3), that is to be kept in hand and that is connected to the welding machine (1) by means of a flexible pipe unit (2), whereby a welding rod (L), that is led to the welding point from the shielding gas unit (4), is arranged to be melted while being protected by the shielding gas in connection with the nozzle part (3) by means of an arc achieved by influence of the supply unit (1b) for welding current, whereby to improve fire safety of the welding occasion, such as to eliminate risk of fire or to suppress fire, the welding apparatus includes furthermore a coupling arrangement (X) to lead shielding gas, that is led from the shielding gas unit (4) belonging to the welding machine (1), during a hazardous occasion to the point, that is exposed for risk of fire or that is already burning, which coupling arrangement (X) includes organs (X2), that are arranged to interrupt the supply of welding current to the nozzle part (3) and to lead shielding gas to the point exposed for fire or that is burning, by means of the flexible pipe unit (20) through the nozzle part (3) at an increased volume flow rate in respect to the welding occasion, characterized in, that a shielding gas provisioning means (Y), belonging to the coupling arrangement (X), is arranged essentially externally in respect to the welding machine (1) to supply shielding gas during the hazardous occasion directly from the shielding gas unit (4) past the welding machine (1) to the nozzle part (3).

2. Welding apparatus according to claim 1, to the shielding gas unit (4) of which there is coupled a pressure reduction assembly (R2), in connection with which there exists at least control means (1*d*1) for observing, adjusting and processing of the feed volume of the shielding gas and, which includes a secondary space (R2*b*) for shielding gas under reduced pressure, and which space has a first duct (1*d*1') for the control means (1*d*1) being connected to the secondary space (R2*b*) as well as a second duct for leading of the shielding gas flow (Z) during the welding occasion, characterized in, that the first end (I) of the shield gas provisioning means (Y) is connected directly to the secondary space (R2*b*) by means of such as a branch tubing being connected to the first duct (1*d*1') or correspondingly.

3. Welding apparatus according to claim 1, characterized in, that the second end (II) of the shield gas provisioning means (Y) is connected to a connection piece (R3), by which the pipe unit (2) is connected to the welding machine (1).

4. Welding apparatus according to claims 1, the welding machine (1) of which comprises furthermore at least a rod supply unit (1*a*) and means (1*d*3) for regulating of the feed velocity (1*d*3) of the rod, whereby supply of the welding rod (L) from the rod supply unit (1*a*) is arranged by means of a flexible pipe unit (2) and whereby the organs (X2) belonging to the coupling arrangement (X) are arranged to interrupt also feeding of the welding rod (L) to the nozzle part (3) during the hazardous occasion by means of a switch (X1), that exists essentially in connection with the nozzle part (3), characterized in, that at least a part of the organs (X2) belonging to the coupling means (X) are placed in a coupling box (R1) being attached externally to the welding machine (1).

5. Welding apparatus according to claim 4, characterized in, that the organs (X2) comprise an electric coupling assembly for starting of the shielding gas flow for the hazardous occasion and for interrupting of the same as well, that is placed inside the coupling box (R1) and the operating current.

6. Welding apparatus according to claim 4, characterized in, that control of the electric coupling assembly (X2) of the organs, are carried out by arrangements, being placed at least partly inside the pipe unit (2) and at least partly externally in respect to the welding machine (1).

7. Welding apparatus according to claims 1, characterized in, that electric wiring (X2*z*) leaving from the coupling box (R1) is connected to the connection piece (R3), that couples the pipe unit (2) to the welding machine (1).

8. Welding apparatus according to claims 1, characterized in, that the coupling box (R1) is arranged to be attached removably.

* * * * *